United States Patent [19]

George

[11] Patent Number: 4,747,944

[45] Date of Patent: May 31, 1988

[54] RECIRCULATING FILTER SYSTEM

[75] Inventor: Harry George, Naperville, Ill.

[73] Assignee: Midwest Conservation Specialties, Inc., St. Louis, Mo.

[21] Appl. No.: 857,727

[22] Filed: Apr. 29, 1986

[51] Int. Cl.$^4$ .................... B01D 29/08; B01D 36/00
[52] U.S. Cl. .................... 210/167; 210/186;
210/232; 210/241; 210/416.5; 210/453;
210/489; 210/DIG. 8; 210/500.1; 99/408
[58] Field of Search ............. 210/773, 805, 138, 167,
210/186, 232, 241, 320, 356, 416.1, 416.5, 435,
453, 459, 460, 489, 500.1, DIG. 8, 181, 196;
99/408

[56] References Cited

U.S. PATENT DOCUMENTS

| | | | |
|---|---|---|---|
| 2,130,287 | 9/1938 | Nooney | 210/451 |
| 2,183,877 | 12/1939 | Wilkinson et al. | 210/453 |
| 2,578,129 | 12/1951 | Daugherty | 99/408 |
| 2,698,092 | 12/1954 | Morton | 210/DIG. 8 |
| 3,107,601 | 10/1963 | Longmire | 99/408 |
| 3,355,026 | 11/1967 | Schut | 210/DIG. 8 |
| 3,398,673 | 8/1968 | Koplock | 99/408 |
| 3,483,982 | 12/1969 | Nelson | 99/408 |
| 3,616,907 | 11/1971 | Van Vleet | 99/408 |
| 3,648,595 | 3/1972 | Morris | 99/408 |
| 3,685,433 | 8/1972 | Cunningham | 99/408 |
| 3,707,907 | 1/1973 | Wilson et al. | 99/408 |
| 3,759,388 | 9/1973 | Thomason | 210/167 |
| 3,849,309 | 11/1974 | Morris | 210/DIG. 8 |
| 3,849,312 | 11/1974 | Wecker, Sr. | 210/DIG. 8 |
| 3,900,580 | 8/1975 | Boggs | 210/167 |
| 3,968,741 | 7/1976 | Hunt | 99/408 |
| 3,970,558 | 7/1976 | Lee | 210/138 |
| 3,977,973 | 8/1976 | Anderson | 210/167 |
| 4,006,084 | 2/1977 | Priest | 210/180 |
| 4,043,916 | 8/1977 | Wecker, Sr. | 210/167 |
| 4,068,571 | 1/1978 | Cunningham | 210/DIG. 8 |
| 4,282,094 | 8/1981 | Mitchell | 210/DIG. 8 |
| 4,329,226 | 5/1982 | Thompson | 210/489 |
| 4,444,095 | 4/1984 | Anetsberger et al. | 99/408 |
| 4,591,434 | 5/1986 | Prudhomme | 210/167 |

OTHER PUBLICATIONS

Re-Filco Inc. brochure entitled "The Phoenix Oil Refiner".

Primary Examiner—Richard V. Fisher
Assistant Examiner—Linda S. Evans
Attorney, Agent, or Firm—Lee, Smith & Zickert

[57] ABSTRACT

A recirculating filter system for purifying heated liquids, primarily cooking oils or lard, has a sealed filter canister having therein a cotton fiber filter and an upper lid and baffle chamber assembly. An inlet orifice at the bottom of the canister is fed by a pressurized line containing impure oil. An outlet at the top of the canister carries the filtered oil from the baffle chamber to a return line back to the cooking vessel. The cotton fiber filter is contained below the lid and baffle chamber assembly by a retainer pad means forming a second stage to the filtering. A motor and pump assembly siphon the impure liquid from a cooking vessel and, by virtue of an appropriately sized intermediate pressure line, keeps a substantially constant inlet pressure into the filter canister and throughout the system, whereby relatively constant pressure and flow is maintained in the system, with a slight back pressure against the pump, and wherein recirculating filtering of the liquid medium may take place on a continuous or selected intermittent basis. The recirculating filter system is capable of being fully portable and preferably retrofit to existing equipment and space requirements without the need for modification to restaurant equipment.

23 Claims, 3 Drawing Sheets

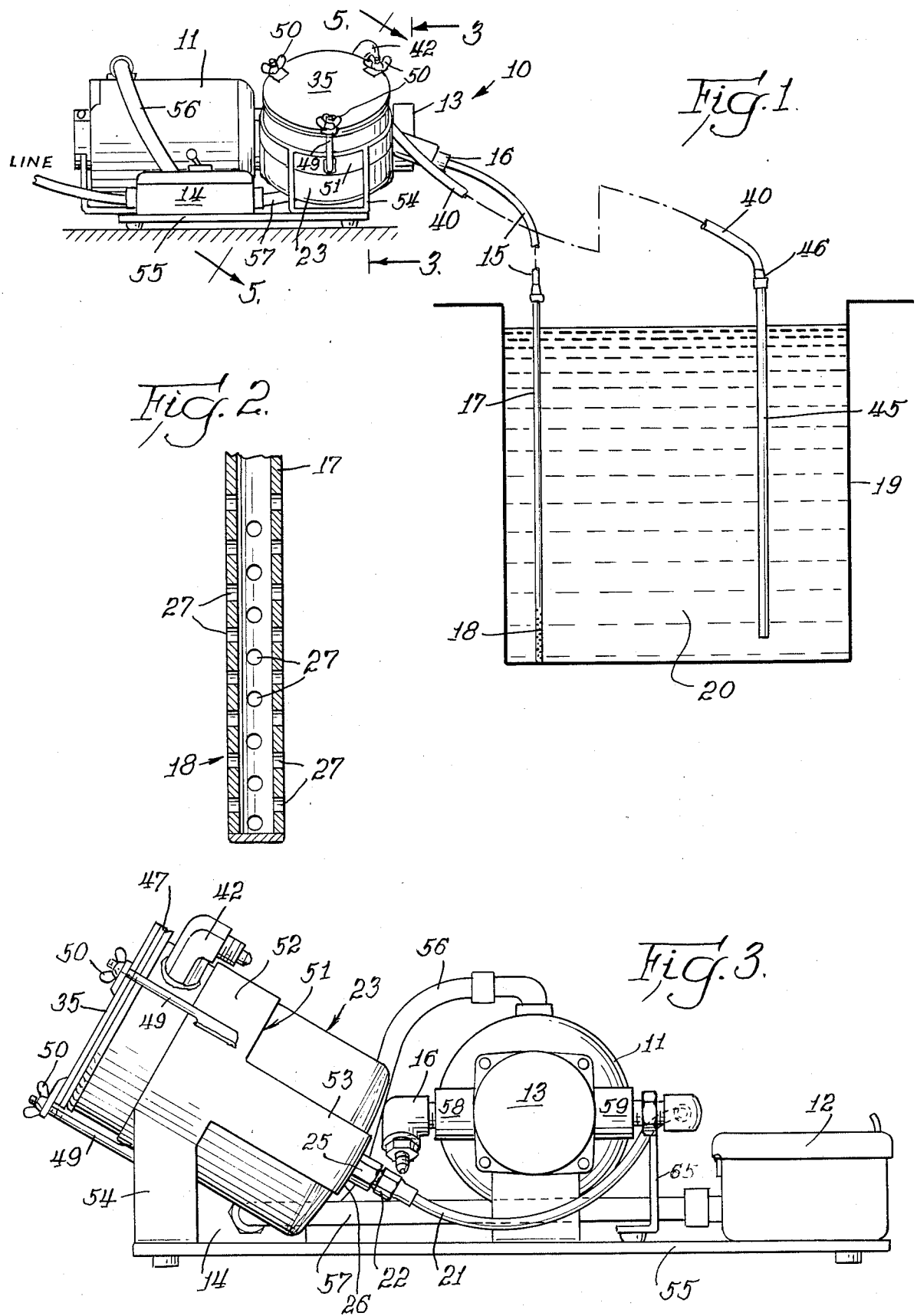

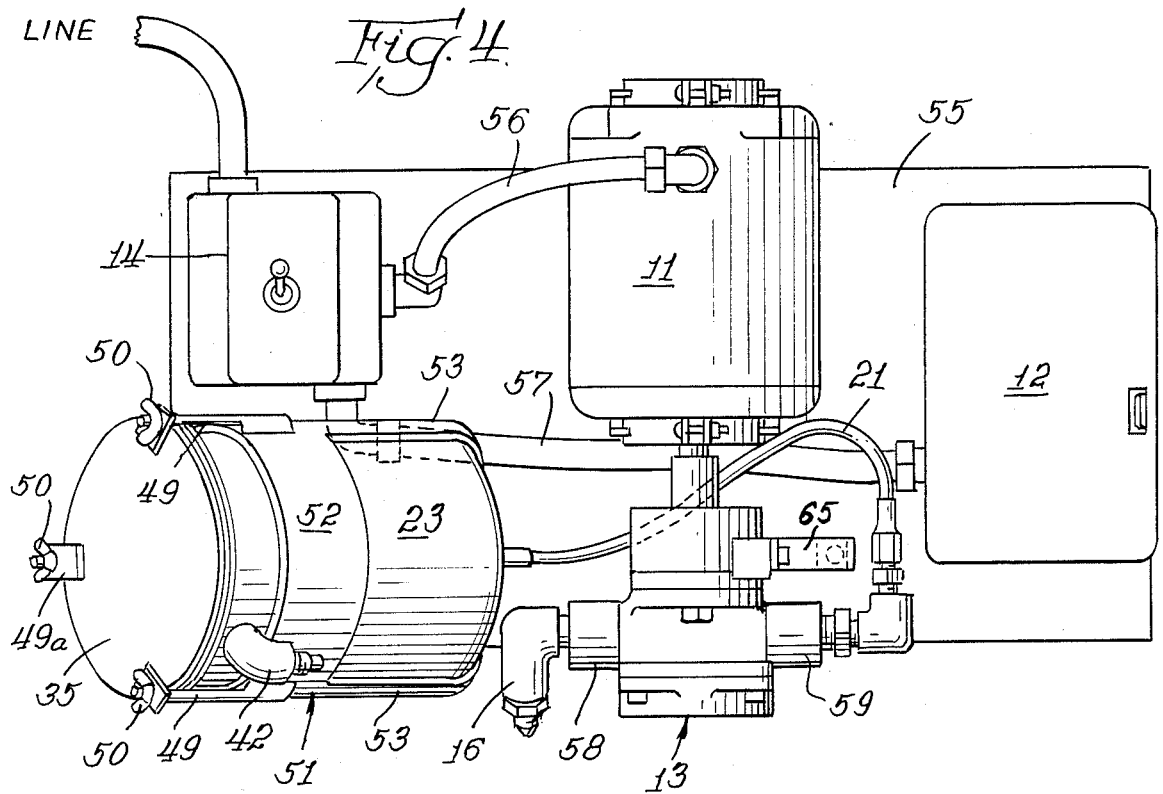
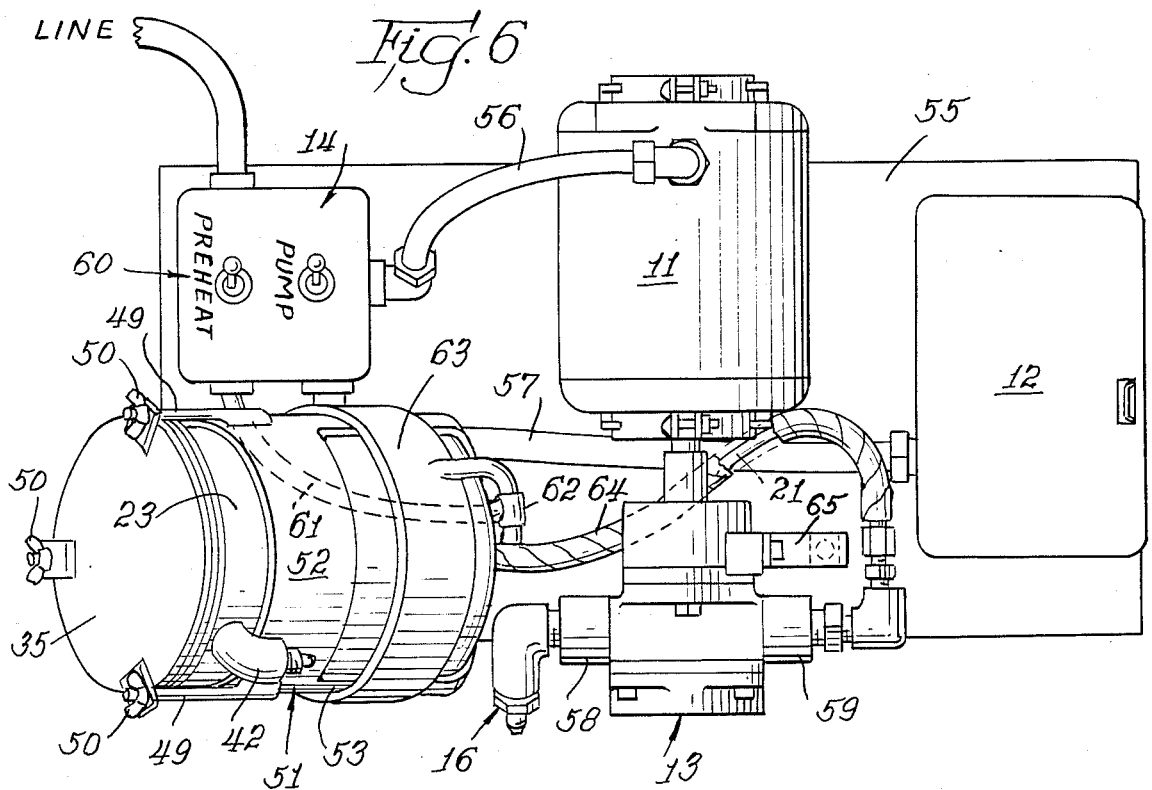

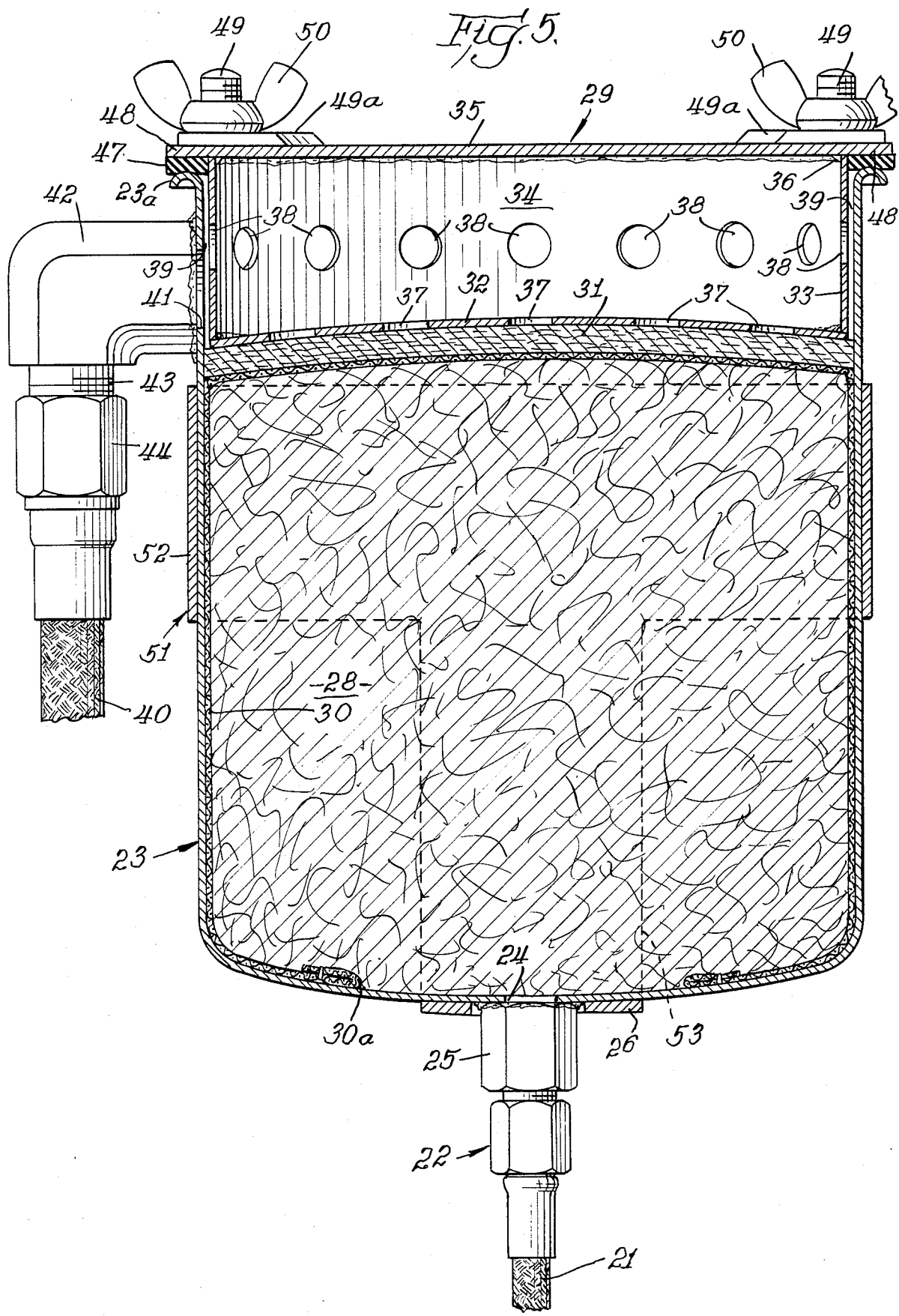

RECIRCULATING FILTER SYSTEM

BACKGROUND AND SUMMARY OF THE INVENTION

The invention is generally directed toward filtering and purifying heated liquid media and is primarily directed toward filtering and purifying cooking oils used in deep fry cooking. The invention is more specifically directed toward providing a retrofit recirculating filter system which is a separate apparatus from the deep-frying equipment.

Deep fry cooking, especially in fast-food type restaurants, necessitates maintaining a large volume of fate or oils at high temperatures usually from about 250° F. to 450° F. The maintenance of the purity of these cooking media is a great concern to the restaurant owner as well as ultimately the consumer. When a cooking oil is not filtered or purified, its useful life can be limited to just one business day, and sometimes less. The useful, and healthful, life of a cooking oil medium is also affected by the type of food being cooked. Even with daily draining and straining through a cloth strainer, the cooking oil at best can be kept useful and healthy for no more than about two to four days even when cooking only a single type food. Standard size deep fryers used in commercial establishments will typically hold from about two to about six gallons of oil or shortening. In large establishments numerous deep fryers are used. With the cost of cooking oil at its present value, each fryer may hold up to about fifteen to thirty dollars worth of material. Accordingly, the replacement costs for these cooking oils can be a significant expense in fast-food outlets and restaurants. If the cooking fats or oils are not cared for properly, these repetitive expenses must be incurrd after the useful life of the oil has ended, which is usually a maximum of two to four days.

When foods are cooked by deep frying, a greater amount of the fat or oil is absorbed by the food when the cooking medium is contaminated with moisture, free fatty acids, and carbons. Contamination and the degradation of the cooking fat or oil commences as soon as it is heated and the first food to be cooked is placed into it. Degradation of the cooking oil continues at an accelerated pace as time elapses and as more food is cooked in it. The standard analysis for determining whether a cooking oil is suitable for further use involves measuring: (1) peroxide value, which is the progression toward rancidity (oxidation breakdown); and (2) the measurement of the free fatty acid which is a reading of the hydrolytic breakdown of the fat.

Degradation of the cooking oil is further advanced by the introduction of water from the foods being cooked therein and also from the solid residue left in the oil from seasonings, flavor enhancers, and particles of batter or breading that drop from the food items as they are being cooked.

The oxidation breakdown of fresh cooking oil or fat is about 1.0 units. When the oxidataion breakdown reaches 20.0 units, the fat or oil is rancid and should be changed. The hydrolytic breakdown of the fat in a fresh oil or fat, such as lard or shortening, is about 0.05 percent. When the hydrolytic breakdown reaches 2.0 percent, the oil or fat should be changed. The principal causes for the degradation of cooking oils or fats in deep fryers are therefore considered to be oxidation and the presence of free fatty acids. The continuous heating of the cooking oil, as well as the usual cooling off period overnight followed by reheating the next morning, contribute greatly to the oxidation process. The solid residue left from the food and batter accelerates the oxidation process toward rancidity. Also, the solid residue that remains in the cooking medium becomes scorched and results in the discoloration of the oil or fat and also tends to transfer odors and bad taste to other foods cooked in the medium. The cooking ability of contaminated and degraded oil is much less and becomes worse during further cooking since the breakdown causes greater amounts of the oil or fat to be cooked into the food placed therein.

Certain free fatty acids, such as palmitic, oleic, amino, and stearic, can also be driven from the foods being cooked and contribute to this degradation of the cooking oil and fat. Numerous compounds and agents have been used in the prior art treatment of cooking oils and fats, such as the use of potassium hydroxide, to reduce acidity. Also, activated bone char has been used to eliminate odors. Others have taken advantage of the hygroscopic and absorbent qualities of diatomaceous silica for use in filtering apparatus. Various screening device, cardboard and paper filter layers, and homogenizing disks have also been used in the past.

The prior art techniques offer a myriad of systems and apparatus that usually either require very elaborate and complicated installation necessitating constant maintenance and frequent service, or a system with limited application caused by an inability to be useful in a variety of different deep frying cooking systems or requiring a large amount of alteration and modification to in-place deep frying equipment. Certain portable systsms have been developed in the prior art but have met with limited acceptance in the industry.

The problems addressed by prior art filtering and purifying techniques focus on extending the useful life of the cooking medium and thus reducing the cost of replacing oils and fats. Some techniques employed in the prior art involve extending the useful life of the cooking medium by not overheating the oil or fat. Other non-mechanical filtering techniques involve the simple removal of solid residue left in the deep fryer on an ongoing basis during the day, such as pieces of food and batter that fall through the cooking basket often used for onion rings, french fries, and the like. Also, a daily draining procedure of the cooking medium from deep fat fryers has been used and thereafter the oil or fat is drained through a metal or cloth strainer.

One techique which will extend the life of a cooking oil or fat is to use a separate deep fat food fryer for each specific type of food to be cooked. This is not always possible in smaller establishments. A separate fryer system necessarily requires the heating of numerous independent volumes of cooking media which may be unevenly used and add further cost to the cooking procedure. Highly sophisticated apparatus have employed a series of disk-type screens or cylindrical filtering units housed in canisters. Either negative or positive pressure siphon systems have forced the cooking oil on a continuous basis through such filters to purify or clarify the oil.

It will be understood that the treatment of cooking media involves the full variety of cooking substances, used, such as shortening, lards, animal and vegetable fats and oils, collectively sometimes referred to herein as simply cooking oil or fat. It would be desirable for a filtering and purifying system to be applicable to all cooking media used in so-called deep fat frying. In view of the foregoing problems of degradation and contamination found with the utilization of deep fat frying media, it is a primary purpose of this invention to provide a highly effective, dependable, portable apparatus, preferably for retrofitting with existing frying systems, having substantially universal capability for filtering and purifying cooking oils used in deep fat frying.

It is further an object of the invention to provide a retrofit filtering and purifying apparatus usable with existing deep fat frying vessels without the necessity of modifying or altering present restaurant equipment.

A concomitant object of the invention is also to provide a system that is fully portable allowing the restaurant owner to move it from one site to another as needed or retrofit with existing frying systems.

A collateral object of the invention is to provide such a filtering system that can be housed above or below the deep fat fryer, or even alongside, in a semi-permanent design whereby it can be incorporated with a variety of existing cabinet arrangements at restaurant work stations.

An important object of this invention is to provide a suitable and efficient method and means for greatly extending the useful life of the cooking medium.

Another object of the invention is to provide a filtering apparatus and system that effectively filters fine food particles, fatty acids, carbons, oxidized matter, and residue down to about three microns in size.

Another important object of the invention is to provide a filtering system that also purifies the cooking oil by eliminating odors created by the foods cooked therein.

Another important object of this invention is to extend the useful life of the cooking medium without the need to replace or modify existing deep fat fryers that are presently in use. A particular advantage offered by this invention is the method and means whereby the retrofitting of this invention to an existing deep fat fryer can be accomplished by a layman, minimally experienced in the use and maintenance of deep fat fryers and the cooking medium used therein.

Another object of the invention is to provide a filtering system, method, and apparatus which purifies cooking oil on a recirculating and continuous basis whereby the taste from previously cooked food is not transferred to the next type of food cooked therein.

Furthermore, it is another goal of the invention to remove water that is introduced into the cooking oil without the use of a hygroscopic or other absorbent compound.

A related object of the invention is to achieve the filtering of cooling oil in the normal high temperature cooking temperature ranges of from about 250° F. to about 450° F.

Another objective of the invention is to have the capability to filter and purify cooking oil which may be of the solid type, such as lard, as well as the liquid type, such as vegetable oils.

Another object of the invention is to provide a simply maintained and efficient system requiring very little installation time and cost, or continuing supervision.

It is further an object of the invention to provide a filtering system for deep fat frying wherein a hardened shortening or lard medium is used whereby a portion of the apparatus may include heating means adapted to liquefy hardened shortening therein when the system is activated whereby to be almost immediately ready for use when required.

A further goal of the invention is to provide the combination with a timer control device for a retrofitted recirculating filter system, which control device may sequence the operation on a predetermined time schedule or which may be continuously set to run throughout the period in which the cooking oil in the deep fat fryer is used. The invention would also be desirably usable with a temperature or pressure sensitive control means for monotoring same to activate or de-activate the system at pre-set pressure or temperature values.

It is a further object of the invention to provide a recirculating filtering system for cooking oil that can extend the useful life of cooking oil in a fast-food type restaurant, thay may be open for a substantial portion of each day, up to about at least eight to ten days without requiring changing the oil. Additionally, it is a collateral object of the invention to provide such a system wherein the filtering medium used in the apparatus need only be changed once every week to ten days of operation, or at the same time that the oil is changed once a change interval is established for a particular deep frying system.

An additional related object of the invention is to provide a recirculating filtering system that is not limited to application for deep fryers using cooking oils but may be also used in the pharmaceutical and chemical industries for filtering and refining in various industrial and chemical procedures, liquids such as acetone, acid baths, washes and flushes, in order to remove impurities therefrom and whereby to be able to extend the longevity of the liquid for subsequent baths, washes and the like.

Accordingly, it is an object of the present invention to provide an improved filtering system for cooking oils to eliminate the contamination and degradation caued by oxidation breakdown that causes rancidity, and the hydrolytic breakdown, that causes free fatty acids to be deposited on the foods cooked. This invention provides a complete filtering system that removes solids to micron size and the free fatty acids caused by introduction of water from foods cooked therein.

The invention can be summmarized as providing a pump-driven siphon drawing means taking a liquid, for example, liquefied hot cooking oil, from the cooking vessel through a pickup and draw line to be introduced under pressure into the bottom of a filter canister containing a fiber filtering media and an overlying retainer padding. The filtering media being contained within the canister by a lid assembly means. An outlet port associated with the interior of the canister in a region defined by the lid assembly means in a space therein above the retainer pad whereby to receive, under pressure, oil forced upwardly through the filtering media. The outlet connects with a return line and, preferably, into a return tube extending interiorly of the cooking vessel for return of the filtered and purified oil.

In accordance with the present invention, cooking oil, normally at temperatures of from 250° F. up to about 450° F. is picked up from the cooking vessel and passed through the filter canister and circulated back into the cooking vessel clean of solid particles of down to at least about 3 micron size. Depending upon the individual requirements for filtering system, the filtering can be combined with a control timer for (1) continuous, (2) intermittent, or (3) timed cycling. By add-on devices to the filtering apparatus the system can be made automatic whereby (1) the amount of time for which the filter may be used may be monitored, (2) it can be set for start when suitable operating oil temperature is reached, (3) it may be set for shut-down when oil temperature falls below suitable operating temperature, or (4) it may be set to shut-down when back pressure is too high or if the siphon should draw air.

The system is intended to operate under a little back pressure and provide a capacity of from about 15 to 48 gallons per hour of filtering with pressure optimally in the range of from 5 to 35 p.s.i. created by a motor and pump assembly which siphons the oil from the cooking vessel. The pump pressures it through the filter material into the lid assembly means which is subsequently returned under pressure to the cooking vessel in filtered form. The introduction of the cooking oil into the filter canister from a pressure line coupled to a bottom orifice of the filter canister causes a compressing effect against the filter media that forces it to press upwardly against the retainer pad abutting a lower retainer and baffle means, or bottom wall, of the lid assembly, which bottom wall is concave. The lid assembly means includes the bottom wall, each being perforated in a proportion to the filter canister size. The side wall is spaced from an inside wall of the filter canister which forms a baffle space whereby the oil moving upward from the filter media and felt pad is moved under pressure into the annular baffle space for return through the outlet port back into the cooking vessel. A solid top wall of the lid means covers the open top of the filter canister in tight sealing relationship made possible by a gasket and mechanical locking means. The pressure line, also called the intermediate line, extends between the pump and the bottom orifice of the filter canister and has a length and internal diameter sized and proportioned to: the pump/motor size; the volume of the portion of the filter canister containing the filter; and, the intake and outlet dimensions of the system. The proportions are formulated so that the pressure line, the canister, and the annular baffle space are maintained at substantially equal back pressure, and to be substantially continuously filled with oil, so that the whole system from the siphon intake to the return tube is also substantially full under a substantially identical pressure during operation.

The inventive filtering system, method, and apparatus therefor, preferably utilize a raw cotton fiber as the filter medium in the filter canister, which is arranged to be easily removed and replaced.

BRIEF DESCRIPTION OF THE DRAWINGS

FIG. 1 is a side elevational view of the preferred embodiment for the recirculating filter system shown in use with a deep frying vessel and having an intake siphon and return tube extending into the vessel;

FIG. 2 is a detailed view of a perforate foot strainer end of the siphon tube shown in the deep frying vessel of FIG. 1;

FIG. 3 is an elevational view of the apparatus shown in FIG. 1 viewed along line 3—3 looking in the direction of the arrows;

FIG. 4 is a top view of the recirculating filter system apparatus shown in in FIG. 3;

FIG. 5 is a sectional view of the filter canister taken along line 5—5 of FIG. 1 looking in the direction of the arrows showing the interior thereof and also inlet and outlet couplings associating with the filter canister; and FIG. 6 is a top view of the recirculating filter system substantially as shown in FIG. 4, but with the addition of preheating means whereby to facilitate the liquefying of hardened shortening or lard held in the system when the system is to be used with such cooking media rather than media that remain liquid at room temperature.

DETAILED DESCRIPTION OF THE PREFERRED EMBODIMENT

Throughout this specification, like reference numerals refer to the same elements throughout. The description of the preferred embodiment is not to be considered as limiting the appended claims to the specific tolerances, dimensions, materials and sizes described, since these are provided for the purposes of enabling one skilled in the art to practice the invention but without intending limitations thereto, as would be understood.

With reference first to FIG. 1, the recirculating filter system is generally denoted at reference numeral 10. The system 10 includes an electric motor 11, optionally operated by a timer control 12, which may be set for continuous, intermittent, or timed periods, and may be of a conventional design whereby to be either manually operable, or set for automatic time cycling as desired. The timing control 12 by itself forms no part of the invention. A pump 13 is operated when the motor 11 is activated. The timer 12 is supplied with electricity through an on/off switch box 14. The timer 12 may be deactivated and the switch 14 utilized for manual activation of the system, rather than automatic control, as would be understood. A pickup draw line 15 extends from the intake side of the pump having a coupler 16 to a siphon tube 17 terminating at a perforated foot strainer 18 for receiving oil. The siphon tube 17 extends downwardly into a deep frying vessel, or vat, 19 containing, in the exemplary embodiment, a cooking oil 10 of the liquid type, e.g. peanut oil, which retains its liquidity at room temperature, wherein most lard-type media begin to harden at and below about 175° F. However, the invention is usable with lard which hardens overnight, as will be explained hereinafter.

The pump 13 is of a conventional design and when activated by the motor 11 will draw oil through the foot strainer 18 into the siphon tube 17 and through the pickup line 15 to be pressured by the pump 13 into intermediate pressure line, or hose, 21. Thereafter, the oil under pressure is conveyed through the line 21 to a coupling 22 at the bottom of a filter canister 23. A bottom canister inlet orifice 24, best viewed in FIG. 5, larger than the inside diameter of the pressure line 21, receives therethrough the oil passing into the canister 23. A fitting 25 is welded to the bottom of the filter canister 23 around inlet orifice 24. The fitting 25 has a conventional threaded male portion engageable by the interior of the threaded coupling 22. A bottom canister support strap 26 is apertured for receipt therethrough of said fitting 25. Strap 26 is a part of a canister holding frame described hereinafter.

The perforated foot strainer 18 is best viewed in FIG. 2 wherein in the preferred embodiment 32 intake apertures 27 are provided, each having a diameter of ⅛ inch. The inside diameter of the siphon tube 17 is 9/64 inches in the exemplary embodiment, which is approximately 1/64 inch plus the diameter of an inlet aperture perforation 27. Thereby, should food particles clog even a major portion of the number of aperture perforations 27, there still will be sufficient intake opening area to fully feed the siphon 17. The opening dimension of perforations 27 exclude particles of a size that would clog the pump. Anything smaller will pass safely through the pump 13. The larger sized particles eventually drop off the foot strainer 27 and may be simply hand-strained and collected.

The arrangement of the intermediate pressure line 21 with respect to the poump 13 and the bottom of the filter canister 23 is best viewed in the elevational view shown in FIG. 3. FIG. 3 does not show the vessel 19 in order to more clearly illustrate the relationship of the other components.

The inlet orifice 24, or pressure entry port, of the filter canister 23 is centrally located at the bottom of the canister 23, preferably at it lowest well portion as shown in FIG. 5. As the oil enters the filter canister 23 through orifice 24, the filtering and purification of the oil commences by virtue of contact with a filter media 28 filling the filter canister 23 interior space up to a lid and baffle structure, or simple lid assembly, generally denoted at 29. In preferred form, the filter media 28 is a one-pound mass of raw cotton fiber contained within a knitted cotton sock 30 having a drawstring controlled opening 30a at the bottom, as shown in FIG. 5. At the opposite end of the filter media 28, the sock 30 is closed and abuts against a felt backing, or retainer, pad 31. The felt backing pad 31 is a disk-shaped element which is in preferred form about ¼ inch thick and of a diameter no less than the interior diameter of the canister 23. Pad 31 provides a secondary filtering means as well as retaining the filter media 28. At the opposite side, the felt backing pad 31 abuts a perforated filter retainer and return baffle, or bottom wall 32, which is a bottom wall of the lid assembly 29. The bottom wall 32 in preferred form is concave but may be flat. However, it has been found that it is not effective if convex. The bottom wall 32 is perforated, as will be hereinafter described, and terminates at a perforated side wall 33 which forms a circular interior side wall of lid assembly 29 adjacent the side wall of the shell-like filter canister 23. The side wall 33 is affixed, such as by being welded, to the bottom wall 32 therearound to form an integral structure and defining a baffle return chamber 34 thereabove. The top of the baffle chamber 34 is sealed thereacross by a solid lid portion, or top wall, 35 of lid assembly 29, which is also affixed, such as by welding, to the upper rim edge 36 of the continuous perforated side wall 33. Thereby the lid assembly 29 is hollow and formed to be an integral unit made up of the retainer and return baffle or bottom wall, 32, side wall 33 and the solid top wall 35, whereby to be removable from the filter container 23 as will be explained below.

As the liquid oil is introduced through the bottom inlet orifice 24, it presses upwardly against the cotton filter media 28 and compresses it against the felt retainer pad 31 which in turn is compressed against the underside of the concave bottom wall 32. The felt pad 31 prevents cotton fibers from passing through and thus keeps them from entering the cooking oil vessel. The pad 31 also filters other particles from the oil and serves as a second filter. As the pressurized oil moves upwardly and compresses the filter media 28, the oil is filtered and purified down to at least about 3 microns particle size, which filtering eliminates the free fatty acids, carbons, solids, oxidized particles and products of hydrolytic breakdown. The oil moves through the pad 31 and then through the bottom wall 32 via a series of relatively large ⅜ inch perforations 37 extending therethrough. These perforations are preferably symmetrically located about the center of the circular bottom wall 32. In the preferred embodiment, seventeen perforations 37 are provided in a pattern with one being centrally located and the remaining sixteen being spaced in two concentric circles of eight each therearound. The side wall 33 also includes seventeen perforations 38, which in the disclosed embodiment have the same diameter as the perforations 37. The number and size of perforations 37 need not be identical to perforations 38. In the embodiments shown there is room for yet another equal-sized perforation 38 to be added. A major objective in forming the perforations 37 and 38 is to proportion them in the system to create a full flow under a little bit of back pressure against pump 13 whereby the baffle chamber 34 is kept full under pressure. The pressurized oil fills the chamber 34 and flows outwardly under pressure through the perforations 38 into an annular gap spacing 39 defined between the shell-like filter canister 23 and the side wall 33. In the preferred embodiment the interior diameter of the canister 23 is 5-13/16 inches, and the diameter of the side wall 33 is 5-11/16 inches, whereby to provide a 1/16 inch flow width for gap 39 therebetween. At this point when the baffle chamber 34 is full, and continuously throughout the continuing operation of the system 10, the pressure line 21 is filled with oil, the filter media portion 28 is filled with oil, and the cansiter 23 below the bottom wall 32 is filled with oil. As the flow is pressured upwardly, the oil in chamber 34 and gap 39 is under pressure and is forced around inside gap 39 until the purified oil, which is on the topside of the felt regaining pad 31, exits the filter canister 23 through a return line 40 that is fed via an outlet port 41 in the shell-like wall of the canister 23 that opens to the annular gap 39 above the felt pad 31. An elbow coupling 42 is affixed to the canister 23 at the outlet orifice 41 and includes a threaded stem portion 43 that is thread engaged to the threaded interior of a coupling 44 having a conventional design and attached to the end of the return line 40 in a standard arrangement. During the operation of the system 10 the canister 23 and pressure line 21 are filled and under back pressure, the oil recirculates, and pumped purified oil returns to the vessel 19 via a return tube 45 which is joined to the other end of return line 40 by a coupling 46. Preferably, the return tube 45 extends downwardly into the oil 20 held in the vesseel 19 to prevent splattering. The entrance of the returning oil pumped under pressure through the tube 45 also creates agitation to mix and stir the oil so that contaminants are moved and distributed whereby ultimately to be directed to be taken for recirculation in the system 10 through siphon 18 at perforations 27.

It will be observed that the lid assembly 29 is sealed around a turned-over lip portion 23a at the open upper end of the filter canister 23 by virtue of a gasket or sealing ring 47 that seats flushly against an extending peripheral lip portion 48 of the top solid lid 35. Lip portion 48 overlaps and seals against the gasket 47 to compress it against the turned-over lip 23a of the canister 23 so that no oil may leak through. A plurality of threaded studs 49 extend through brackets 49a which are welded to the top of the solid lid 35 and include openings therethrough for receiving the studs 49. Wing nuts 50 thread onto studs 49 and serve to clamp down against the brackets 49a and thereby tighten the lid assembly 29 against the upper rolled over lip 23a of the canister. The threaded studs 49 are affixed, such as by welding, to a canister holding frame 51 which is formed to have a generally circular band 52 receiving the canister 23 therein and also having integrally formed strap portions 53. The strap portion 53 extend downward to meet and join with the bottom support strap 26, shown in FIG. 5 beneath the canister 23, whereby the holding frame 51 is removably associated with the canister 23 upon detachment of the wing nuts 50. A leg portion 54 of the holding frame 51 extends at right angles to a support bed 55 which supports the motor 11, timer 12, pump 13, switch box 14, and holds the canister 23 at an angle. Thereby, the system 10 may be arranged on said bed 55 to be slid inwardly and outwardly of a shelf above or below the deep frying vessel 19 and wherein the lid assembly 29 is thereby conveniently angled toward the restaurant owner in order to provide access for cleaning and replacement of filter media 28 in a facile manner. Optionally, if the bed 55 were attached vertically, whereby a wall-mounted arrangement would be provided, the canister 23 would be conveniently angled away from the wall so that the restaurant owner could have easy access to the top and be able to peer inwardly of the canister 23 in order to remove the filter media 28 and sock 30, along with the felt pad 31, when needed after they have been contaminated to the point of requiring replacement. The continuing draw of oil through the pump 13 into the filter canister 23 and filter media 28, along with the flow of the contaminated oil through the felt pad 31 under pressure, continually forces purified oil from the upper chamber 34 back into the cooking vessel 19 where a final stage of cleansing is accomplished as water particles that are separated from the oil are then flash vaporized at the moment of re-entry to the cooking vessel 19 and hot oil 20.

FIG. 4 shows a top plan view of the recirculating filter system 10 and depicts how the components for the apparatus are conveniently stationed on the support bed means 55. More clearly shown in the connecting electric line 56 that joins the on-off switch box 14 to the motor 11. Additionally, a connecting power line 57 connects the timer 12 to the power switch box 14 in such manner, if desired, that the timer will control activation of the system, such as at intermittent times, timed sequences, continuous pre-set times of day, etc. Of course, continous operation all the while that the deep fryer 19 is heated may be employed. By adding a timer 12 to the system 10 the system can be made fully automatic whereby the calculation of the time in use may be recorded and therefore the time to change the filter media 28 may be monitored. Additionally, the timer 12 might also be incorporated with an on-off thermostat circuit whereby to automatically start when the desired operating or cooking temperature of the oil is reached and then automatically shut down when the temperature falls below this value or some other preset value. Also, a safety pressure valve means may be employed with the timer 12 control circuit so that the pump 13 may be shut down when for example, the siphon tube is clogged, or conversely when the siphon tube 17 draws only air. Accordingly, the system 10 may be usable as a simple manual system or may incorporate a timer and/or temperature or pressure, controlled operating means.

It will also be seen from FIG. 4 that the pump 13 includes appropriate standard coupling and fitting assemblies at 58 and 59 for, respectively, the engagement at the inlet side with the pickup draw line 15, and at its outlet side the engagement with the intermediate pressure line 21 extending from the outlet side to be joined to the fitting 25 at inlet orifice 14 of the filter canister 23. As shown in the exemplary embodiment for the recirculating filter system 10, the pickup draw line 15, the intermediate pressure line 21, and the return line 40 all preferably comprise 450° F. braided tubing having interior PTFE tube lining, such as that sold uner the trademark TEFLON, which is well suited for use in the usual cooking ranges for deep fat fryers which can be often in excess of 400° F. These stainless steel braided lines permit versatility for system 10, allowing the disposition of the siphon tube 17 and return tube 45 to be arranged in a variety of dispostions for applications in various restaurant facilities. The use of the flexible braided TEFLON tubing at 21 also permits the arrangement of the components on the support bed means 55 to be altered as needed for spacing requirements as might be desired by an installer. Of course, solid stainless steel tubing could be used for lines 15-18, 21, and 40, 46, 45, if an installation spacing/size would lend itself to being "hard-piped" in a more permanent type installation.

In the exemplary embodiment, pickup line 15 has an inside diameter of 9/64 inches and connects to the inlet pickup side of pump 13. The stainless steel pickup tube or siphon tube 17 similary has an inside diameter of the 9/64 inches and wherein the foot strainer portion 18 is three inches in length whereby to accommodate 32 holes therearound, each having about a ⅛ inch diameter. The intermediate pressure line 21 extending from the output side of the pump 13 has, in the disclosed embodiment, an inside diameter of 3/16 inches and a length of about twelve inches. In the embodiment disclosed for the achievement of desirable results, it has been found that the length of the intermediate pressure line 21 should be twelve inches plus or minus one inch in order that the pump does not receive an undue amount of back pressure causing it to bog, while at the same time providing a satisfactory length so that an even pressure is achieved throughout system 10 as the pump 13 pumps oil of different viscosities through the inlet orifice 24 into the interior of the filter canister 23 and also so that an even pressured flow moves upwardly through the filter media 28, the felt pad 31 and retainer and return baffle, or bottom wall, 32, in order to be ultimately dispensed through the side wall perforations 38 then through outlet orifice 41 and back to the deep fay frying vessel 19 via return line 40.

The intermediate pressure line 21 fluidly communicates through the bottom center inlet orifice 24 into the filter canister 23 whereat the port fitting 25 and the orifice 24, have a passage of 7/16 inch diameter. The port fitting 25 is welded to the bottom of the canister 23 around orifice 24. The outlet orifice 41 communicates with the baffle chamber 34 and has an opening diameter of 11/16 inches and is centered one inch below the rolled lip edge 23a of the canister 23. The outlet port fitting 43 is an 11/16 inch diameter elbow fitting that is coupled to a coupler 44 at threaded stem portion 43 thereof. The coupler 44 has an internal diameter of 5/16 inches. The stainless steel braided return line 40 in the disclosed embodiment has a minimum inside diameter of 21/64 inches to assure smooth flow therethrough for return to the cooking vessel 19. Accordingly, pickup draw line 15 and tube 17 provide a smaller internal diameter than intermediate pressure line 21 which in turn has a smaller internal diameter than return line 40 and tube 46.

It is the intention of this invention to be adaptable for universal use with all kinds of cooking oils, fats, shortening and lard. When lard or shortening, which is solid at room temperature, is used, a particular problem arises when the cooking vessel is cooled, such as when shut off for the night. Unlike peanut or corn oil, for example, a lard will solidify when the temperature drops below about 175° F. to about 150° F. As a result, the system 10 will experience a hardening of the shortening in the critical intermediate pressure line 21 and the filter canister 23. With reference now to FIG. 6, it will be seen how this problem with the hardening lard, or shortening, is solved in system 10. In FIG. 6, an identical recirculating filter system 10 is provided except for the modification to the switch box 14 and the introduction of preheating means for the intermediate line 21 and the filter canister 23.

It will be observed that the switch box 14 is made to include a separate preheater switch and circuit means therefor which is identified generally at reference numeral 60. Power line 61 extends from the box 14 to a coupling 62. Coupling 62, is, in the disclosed embodiment, T-shaped and one side connects to a heat band 63 which is belt-like and extends around the filter canister 23. Band 63 is sometimes known as a heat wrap in the industry. At the other side of the T-coupling 62 there is connected a strip or layer of 450° F. heat tape 64 which is wrapped around the intermediate pressure line 21.

In operation, when the restaurant owner begins to heat the cooking vessel 19, which has the hardened lard or shortening inside, he will initially, and before switching the switch box 14 to activate the pump 11, first activate preheating circuit means 60 whereby the line 21 and canister 23 begin to warm and the hardened shortening therein begins to liquify. Generally, liquefication occurs at about 175° but it has been found desirable to wait until the temperature reaches 225° F. to activate the system 10. Any hardened lard in the return line 40 or coupling 42 will be immediately liquefied when it comes in contact with the heated and liquid lard moving upwardly through the canister 23 and exiting outlet port 41. As a result, with the provision of the preheating circuit means 60 and heat wrap 63 and tape 64, system 10 can have universal application in a restaurant for any type of cooking oil and lard as well as being very versatile by its unique portability and ability to arrange its intake siphon tube 17 and outlet tube 45 in a wide variety of orientations relative to the arrangement of the pump and motor. It will be clear that a wide variety of heat means, including various resistance-wire devices, may be used equivalently for wrap 63, tape 64 and the preheat circuit means 60.

For the purpose of preventing rotation of the pump 13, an anti-rotation rubber-footed stop bracket 65 is attached to the pump 13 to bump againt the support bed means 55 and prevent the motor 11 from deleteriously and aimlessly rotating the pump 13. As best viewed in FIG. 3, the bracket 65, as shown, need not be attached to bed means 55 and thus is a rotation stop means carried by the body of pump 13 alone.

With respect to the pumping capability and operational characteristics of recirculating filter system 10 as disclosed in the exemplary embodiment, the system is further described as being capable of operating at a volume of 15 to 48 gallons per hour and at a line pressure of from 5 to 35 p.s.i. This is a very efficient working range for a wide scope of typical deep fat fryer sizes, and the pressure range noted is variable due to the change in viscosity of oil caused by temperature variations and, of course, because of different oils encountered. One type of pump motor 11 capable of satisfying this need is a one-quarter horsepower, 1725 R.P.M., 115 volt A.C., 60 cycle, single phase motor, wherein by virtue of the arrangement of the tubing, and the internal line diameters disclosed in relation to the dimensions of the filter canister, which will be hereinafter further explained, the system 10 provides a draw lift of about 66 inches ±6 inches. This means that the support bed means 55 and the components mounted thereon may be arranged either 66 inches above vessel 19 or 66 inches below. This versatility is very desirable where there may be space in a cabinet below a deep frying work station or shelf space up toward the ceiling of a restaurant. Thus, the restaurant owner is given a choice of arrangements whereby system 10 is easily adapted for use in almost any restaurant and kitchen arrangement. It should be further understood to one skilled in the art that the system is not dependent upon the lengths of the pickup draw line 15 or return line 40 in order to provide the pressure range shown in the purifying gallon-per-hour capacity mentioned above. Thus, the pump, motor, canister, switch box, timer mounted on the support means 55 can be arranged laterally of the vessel 19 at almost any reasonable remote location in the restaurant cooking station, since the system is only limited by the draw lift distance capacity as described. Accordingly, a plurality of systems 10 could be provided at a single location in a cabinet or shelf for treatment of different vessels at different distances arranged therefrom.

The particular operational characteristics of system 10 are further provided wherein the filter canister 23 is formed of a stainless steel drawn tube having a 1/64 inch thickness and having a 5-13/16 inches inside diameter. The overall filter canister axial length is, in the embodiment disclosed, about seven inches. The lid assembly 29 is also stainless steel and the retainer and return baffle, or bottom wall, 32 and side wall 33 are 1/16 inch thick. The inside diameter of the side wall 33 is, as stated above, 5-11/16 inches in diameter, whereby to provide the 1/16 inch annular gap 39 therearound with respect to the filter canister 23. The sidewall 33 has a height of 1⅝ inches and the baffle chamber 34 defined between the bottom wall 32 and top plate 35 is of a size thereby proportioned to be filled with oil during operation. The oil is sealed thereby by locking the wing nuts 50 on the studs 49. The oil flow is thereby directed, and pressured by the inlet orifice flow of oil from the pump, to exit outlet 41 in a continuous even flow. The annular gap 39 between the side wall 33 and the canister 23 is continually fed by oil exiting the plurality of perforations 38 through the side wall 33. In the said preferred form, the seventeen holes each have a 3/8 inch diameter, are located 7/8 inch from the bottom of the side wall 33, and spaced one inch on center therearound. These perforations 38 in turn are fed by the oil entering baffle chamber 34 through the plurality of perforations 37. Perforations 37 also comprise seventeen holes of 3/8 inch diameter and extend through the bottom wall 32 in a concentric symmetric pattern. It will be seen that the solid portions of the bottom wall 32 retain the upwardly pressed ¼ inch felt retaining pad 31 as it is forced upwardly by the moving oil. The oil is forced through the felt retaining pad 31 at a relatively even rate through the perforations 37 and fills, under slight back pressure, the chamber 34. The perforations 37 are in the exemplary embodiment arranged whereby one is located at the center of the concave bottom wall 32, and the remaining sixteen are spaced in two concentric circles of different diameters with eight in each of the spaced circles. The sizing and number of perforations 27 and 38 is provided to create a flow path from the filter media 28 that is proportioned in the system 10 to maintain baffle chamber 34 full during operation and also has been found to be effective to be in an arrangement with the line sizes and the filter canister 23 dimensions for cooperation with the pump and motor whereby the system is provided to operate under said desirable even pressure values at substantially all times of about 5 to 35 p.s.i. The pressure varies depending upon the viscosity of the oil pumped therethrough, whereby the purification rate ranges from about 15 to about 48 gallons per hour for the components of the exemplary embodiment of the system 10 having the sizes, dimensions and in the relative porportions herein specified.

The system 10 is also characterized by the utilization of the filter media 28 in the form of raw cotton fiber. As shown, the raw cotton fiber media 28 is enclosed in a knit cotton sock 30 with the drawstring and neck 30a arranged to open toward the inlet orifice 24. The raw cotton fiber and sock fills the filter canister 23 volume below the retainer and return baffle, or bottom wall, 32 and has a height to be accommodated by the canister 23 size set forth above, of about 5¼ inches. The raw cotton fiber provides about 10,000 square inches of surface area for an effective filtering. In the preferred embodiment to achieve the filtering and pressure rates shown, the filter media 28 and sock 30 weigh about one pound. The sock 30 is not needed inasmuch as the felt pad 31 will trap any particles or fibers that move upwardly therefrom. However, the sock is helpful when the filter media 28 is completely filled with contaminants so that the changing of the filter media 28 is made easier by simply removing the sock 30 with the cotton fiber 28 inside and replacing them.

This replacement of the filter media 28 is, as explained above, aided by the provision of the angularly disposed canister 23 held in the holding frame 51 and arranging the canister 23 to incline in the direction of the user. If the filter canister 23 is kept inside of a cabinet, the wing nuts 50 may be easily removed and the lid assembly 29 removed upwardly therefrom to grant access to the felt pad 31 and cotton filter 28 for removal and replacement.

In operation the sock 30 and filter media 28 are forced upwardly as the pressured oil is introduced from the inlet orifice 24. By the central location of the inlet orifice 24 the oil is forced to effectively flow upwardly through substantially the entire thickness of the compressing filter media 28 whereby to provide an even and very efficient filtering operation. Any fibers of cotton that may be trapped by the felt retainer pad 31 have been found to create no impediment to the oil flow therethrough. The felt retainer pad 31 is sized to be equal to, or slightly greater than, the internal diameter of the canister 23 so that it can "belly upwardly" against the concave bottom wall 32, as shown in FIG. 5. The arrangement creates an even sealing surface around the top of the filter media 28 and the retainer pad 31 fully covers the bottom surface of the bottom 32, as well as extending at its periphery to be fully under the annular gap 39 to seal therebelow by contacting the sides of the canister 23 for an effective covering and retaining function.

Accordingly, the raw cotton fiber filter media 28 occupies the lower 5¼ inches of the canister 23 in the exemplary embodiment, and beneficially allows the reuse of the same volume of oil for at least eight typical sixteen-hour restaurant business days, even when different foods are cooked in a single vessel.

In one test of a recirculating filter system 10, a deep frying vessel having a standard capacity of about five or six gallons of oil was used to cook, for sixteen hours a day, eleven different kinds of food such as fried mushrooms, onion rings, french fries, breaded chicken and the like. Prior to the use of the system 10, the oil in the vessel had to be changed every day since it became contaminated, degraded, blackened, discolored, and introduced bad cross tastes to the different foods by the end of the day. Upon the installation of the system 10, as described, the oil was filtered during eight continuous days and tested each day.

The analyses of the oil taken each day were consistent and showed that the oil was healthy and useful in a range of carbon content, fatty acid content, moisture and particle size, far exceeding the requirements set by the health codes and the restaurant industry. No cross tastes were experienced. After eight days, the cotton fiber filter was replaced and the same volume of oil was used an additional eight days with similar excellent purity and color values maintained. The ability to extend the useful life of an oil for this significant amount of time is extremely valuable to the restaurant owner.

Other benefits and applications of the invention will be understood, such as use with, for example, acetone or acid baths, washes and flushes for industrial, chemical and pharmaceutical manufacturing applications. Thus, costly chemical preparations may be filtered and purified for reuse rather than frequently replacing them at further expense.

The foot strainer portion 18 shown is preferably about three inches long and in the exemplary embodiment only the three-inch portion actually needs to be provided for the tube 17. The foot strainer portion may be, of course, made shorter with fewer perforations, as explained above, but the greater the number of perforations, the more assurance there is that it will not be clogged and prevent drawing of the oil into the system. Both the siphon tube 17 and return tube 45 are preferably stainless steel which is commonly used because of health and sanitary reasons in kitchens. The system 10 is well suited for construction with all the described metal lines, tubes, and oil conveying components comprising stainless steel, as would be understood.

Other modifications and changes to the sizing, diameters, power and capacity of the system 10 are well within the scope of this teaching and within the ambit and spirit of the invention and claims appended hereto. Accordingly, the description of the preferred embodiment, including specification and dimensions, are set forth to explain the best mode to those skilled in the art, but are not intended as limitations of the scope of coverage of the claims and the broad range of equivalents thereof.

What is claimed is:

1. A recirculating filter system comprising:
   a siphon tube means for fluidly communicating with a source of a liquid medium to be filtered,
   pickup line means fluidly communicating with said siphon tube means and having a first internal diameter,
   a pump means having the inlet side thereof in fluid communication with said pickup line means;
   intermediate pressure line means fluidly communicating at one end thereof with the outlet side of said pump means and having a second larger internal diameter;

a filter canister means having an open top and a lid assembly sealingly mounted thereover and a closed bottom having means defining an inlet orifice through the closed bottom for communicating with the other end of the intermediate pressure line means, said lid assembly having a top wall, and a concave bottom wall defining a baffle chamber therebetween, said filter canister being filled below said bottom wall with a fibrous filter medium, the filter medium residing above said inlet orifice;

retainer pad means between the filter medium and said bottom wall of the lid assembly;

said bottom wall including means defining perforations for passage therethrough of the liquid medium;

said lid assembly further including side wall means forming the side of said baffle chamber and joining said top wall to said bottom wall and the side wall means having means defining perforations for passage therethrough of said liquid medium, said side wall means formed concentric to said filter canister means, the side wall means having a slightly smaller diameter than said filter canister and defining an annular gap bounded outwardly by the filter canister means and inwardly by the side wall means, and the annular gap bounded around the top by said top wall and around the bottom by the retainer pad means, said annular gap provided for receiving said liquid medium passing through the side wall perforations, and wherein said filter canister means includes means defining an outlet orifice therethrough for receiving said liquid medium from said annular gap, return line means fluidly communicating with the outlet orifice of said filter canister means and having a third internal diameter larger than the second and extending therefrom to fluidly communicate with the source of liquid medium for the return thereof, and a motor for driving said pump means and wherein upon activation of said motor said recirculating filter system positively pressures the liquid medium through said filter canister means for the filtering thereof.

2. A recirculating filter system as claimed in claim 1, wherein said fibrous filter medium comprises cotton fiber.

3. A recirculating filter system as claimed in claim 1, wherein the perforations defined in said lid assembly bottom wall and side wall means are substantially the same in number and size, wherein the inlet orifice of said filter canister means, the length of said intermediate pressure line, and the internal diameter of said pressure line are proportioned with respect to the capacity of said pump means, whereby the filter canister and said baffle chamber during the recirculating filtering operation are continuously filled whereby to create a back pressure therein so that said system is substantially evenly pressured throughout.

4. A recirculating filter system as claimed in claim 1, wherein said siphon tube means includes an intake portion comprising an elongate tube and means defining a plurality of orifices for straining said liquid medium.

5. A recirculating filter system as claimed in claim 1, wherein said inlet orifice at the bottom of said filter canister means is larger than the internal diameter of said intermediate pressure line.

6. A recirculating filter system as claimed in claim 1, wherein the siphon tube means has substantially the same internal diameter as said pickup line means extending therefrom to the pump.

7. A recirculating filter system as claimed in claim 1, wherein the top wall, side wall means and concave bottom wall of said lid assembly are formed in a unitary integral construction, the top wall is solid and is sealingly seated on a gasket means extending around the periphery of the open top of the filter canister means, and further including locking means for said lid assemblhy capable of clamping said gasket between the top wall and open top periphery of said filter canister means.

8. A recirculating filter system as claimed in claim 7, wherein said top wall is spaced from said concave bottom wall and defines the height of said baffle chamber, and wherein said side wall means perforations and the perforations through said concave bottom wall form side and bottom flow-through boundaries of said baffle chamber so that upward liquid flow compresses the filter medium to contact the filter canister means, then passes through said perforations at the bottom wall and leaves the baffle chamber through the side wall means perforations into the annular gap for ultimate outlet from said filter canister means through said outlet orifice.

9. A recirculating filter system as claimed in claim 1, wherein said system includes support means for mounting said motor, pump means and filter canister means thereto whereby to provide a portable unit suitable for retrofitting and said pickup line and return line extend therefrom and are capable of being positioned in a variety of distances and arrangements relative to the support means.

10. A recirculating filter system as claimed in claim 1, wherein the pump means is of a size and capacity to cause the liquid medium in the system to be under pressure in the range of from about 5 p.s.i. to about 35 p.s.i. and to flow through the return line means at the rate of 15 to about 48 gallons per hour.

11. A recirculating filter system as claimed in claim 1, wherein said system includes preheater means for warming said intermediate pressure line and filter canister means to liquify any hardened liquid medium material that may be contained therein between operations of the system.

12. A recirculating filter system as claimed in claim 1, wherein said pump means and filter canister means are located in the range of from 66 inches ±6 inches above to 66 inches ±6 inches below the source of liquid medium to be filtered.

13. A recirculating filter system as claimed in claim 1 wherein the fibrous filter medium comprises a mass of cotton fiber contained within a cotton sock means and wherein upon contamination of said filter medium, said cotton sock means can be removed with the fiber therein and replaced with a like filter medium and sock means.

14. A recirculating cooking oil filtering system comprising: siphon tube and strainer means for siphoning oil from a cooking vessel, said siphon tube and strainer means in fluid communication with pickup draw line means, said pickup draw line means fluidly coupled to an electric motor driven pump at an inlet side thereof, an outlet side of said pump connected to an intermediate pressure line and said intermediate pressure line extends to means defining a centrally located orifice in the bottom of a stainless steel cylindrical filter canister, the filter canister including an open top, and the system further comprising a removable lid assembly covering the open top of the filter canister, the lid assembly integrally formed and comprising a solid top wall, a side wall and a bottom wall, the filter canister including a filter chamber defined between the bottom of the filter canister and the lid assembly, said filter chamber filled with a filter medium comprising cotton fiber, means defining perforations in the side wall and bottom wall of the lid assembly, the solid top wall and perforated side and bottom walls of the lid assembly defining a baffle chamber in the lid assembly for the passage therethrough of the oil flowing under pressure through the cotton fiber, the side wall of the lid assembly being circular and having a diameter slightly less than the filter canister to form an annular passage therebetween, the annular passage further having an upper boundary defined by said solid top wall, and a lower boundary, means defining an outlet orifice through said filter canister and communicating with said annular passage, the baffle chamber fluidly communicating with the outlet orifice by means of said annular passage, a return line means fluidly communicating with the outlet orifice and extending therefrom to return filtered cooking oil to the cooking vessel, and a retainer pad disposed between said perforate bottom wall of the lid assembly and the cotton fiber whereby to retain said cotton fiber below said baffle chamber, said retainer pad extending below said annular passage and thereby defining the bottom boundary of said annular passage, said lid assembly being sealed at said open top, and in operation the system is filled with oil under slight back pressure.

15. A recirculating cooking oil filtering system as claimed in claim 14 wherein said electric motor, pump and filter canister are mounted on a support bed means and are portable as a unit.

16. A recirculating cooking oil filtering system as claimed in claim 15 wherein a holding frame means is mounted to said support bed means for the support of said filter canister and the central long axis of said filter canister is inclined with respect to the support bed means.

17. A recirculating cooking oil filtering system as claimed in claim 15 including a cooking vessel, the support bed means located in the range of from about five feet above to about five feet below said cooking vessel.

18. A filter canister assembly for use in a pressurized filtering system for liquid, said filter canister assembly comprising:

a stainless steel canister shell having an open top, a side wall with an internal diameter, and a bottom wall having means defining a central inlet orifice therethrough for coupling with an inlet line;

a hollow unitary lid assembly defined by a solid upper wall, a perforated side wall integrally joined with the upper wall and extending downwardly therefrom, said perforated side wall being concentric with said canister shell side wall, and a perforated concave bottom wall spaced from said upper wall and integrally joined to the entire bottom edge of the perforated side wall, said walls defining a hollow baffle chamber;

said shell containing a fibrous filter material substantially filling the shell below said lid assembly;

a retainer pad means disposed between the perforated concave bottom wall and the fibrous material;

said perforated side wall of the lid assembly having a diameter slightly less than the internal diameter of the canister shell side wall whereby to form an annular passageway bounded annularly by the shell side wall and the perforated side wall and bounded around the top by the solid upper wall and around the bottom by the retainer pad means;

means forming an outlet orifice through the shell side wall communicating fluidly with said annular passageway for egress of liquid from the shell and, lock means fastening the upper solid wall to the shell over the open top of said shell whereby said filter canister assembly is capable of accommodating liquid under pressure.

19. A filter canister as claimed in claim 18 wherein said fibrous filter material comprises cotton fiber.

20. A filter canister as claimed in claim 18 wherein said retainer pad means comprises a felt pad having a diameter no less than the internal diameter of said canister shell side wall whereby to be capable of being forced upwardly against said perforated concave bottom wall of said lid assembly when liquid under pressure is admitted through said inlet orifice.

21. A filter canister assembly as claimed in claim 18 wherein the perforations of the lid assembly side wall and bottom wall are the same in number and size.

22. A filter canister as claimed in claim 18 wherein said fibrous filter material comprises a mass of cotton fiber contained within a cotton sock and is capable of being compressively compacted by the pressure of a liquid entering through said inlet orifice and wherein said retainer pad means comprises a felt pad capable of straining stray cotton fibers that may leave said cotton sock.

23. A filter canister as claimed in claim 18 wherein said means defining the central inlet orifice includes means for connecting to a pressure inlet line means conveying pressurized liquid therein and having a smaller internal diameter than said inlet orifice, and wherein said inlet orifice has a smaller diameter than the outlet orifice.

* * * * *

UNITED STATES PATENT AND TRADEMARK OFFICE
CERTIFICATE OF CORRECTION

PATENT NO. : 4,747,944
DATED : May 31, 1988
INVENTOR(S) : Harry George

It is certified that error appears in the above-identified patent and that said Letters Patent are hereby corrected as shown below:

At Col. 1, line 14, please delete the misspelling "fate" and insert therefor the word — fats — .

At Col. 2, line 33, please delete the misspelling "systsms" and insert therefor — syetems — .

At Col. 6, line 36, please delete the number "10" and insert therefor the number — 20 — .

At Col. 7, line 7, please delete the misspelling "poump" and insert therefor the word — pump — .

At Col. 16, line 47, please delete the misspelling "liquify" and insert therefor the word — liquefy — .

Signed and Sealed this

First Day of November, 1988

*Attest:*

DONALD J. QUIGG

*Attesting Officer*  *Commissioner of Patents and Trademarks*